United States Patent [19]

MacKenzie et al.

[11] 4,251,696
[45] Feb. 17, 1981

[54] COMPACT TELESCOPING TELEPHONE SET

[75] Inventors: William G. MacKenzie; James T. Asaki, both of Middletown, N.J.

[73] Assignee: International Telephone and Telegraph Corporation, New York, N.Y.

[21] Appl. No.: 68,777

[22] Filed: Aug. 22, 1979

[51] Int. Cl.³ .................... H04M 1/02; H04M 1/03
[52] U.S. Cl. .................................. 179/103; 179/179
[58] Field of Search ........................... 179/103, 179

[56] References Cited

U.S. PATENT DOCUMENTS

| | | | |
|---|---|---|---|
| 3,476,886 | 11/1969 | Ferrari et al. | 179/103 |
| 3,551,607 | 12/1970 | Tommasi et al. | 179/103 |
| 4,018,998 | 4/1977 | Wegner | 179/103 |
| 4,153,822 | 5/1979 | Ueda | 179/103 |

*Primary Examiner*—Daryl W. Cook
*Attorney, Agent, or Firm*—John T. O'Halloran

[57] ABSTRACT

There is disclosed a compact telephone instrument with a telescoping operation. A first housing has a conventional telephone receiver located within a hollow recess thereof. The housing is removably secured to a bottom housing which contains a dialer assembly. A series of guide mechanisms are formed in both housings and are used to accommodate a third housing containing a telephone transmitter. The third housing is slidably mounted within the receiver and dialer housings to enable on-hook and off-hook operations by sliding and extending outwardly for off-hook operation and by pushing the housing inward for on-hook operation. The transmitter housing is accurately guided between the receiver and dialer housings by means of the guide mechanisms to insure accurate and reliable operation relatively independent of the nature of the force exerted by a user on the transmitter housing when operating the instrument. The movement of the transmitter housing between the on and off hook positions automatically activates a hook switch arrangement by means of tabs which are permanently secured on slide members associated with the transmitter housing and which tabs actuate leaf spring switches located on a component board positioned between the dialer and receiver housings. The telephone instrument employs conventional telephone components to further assure reliable electrical and mechanical operation.

24 Claims, 15 Drawing Figures

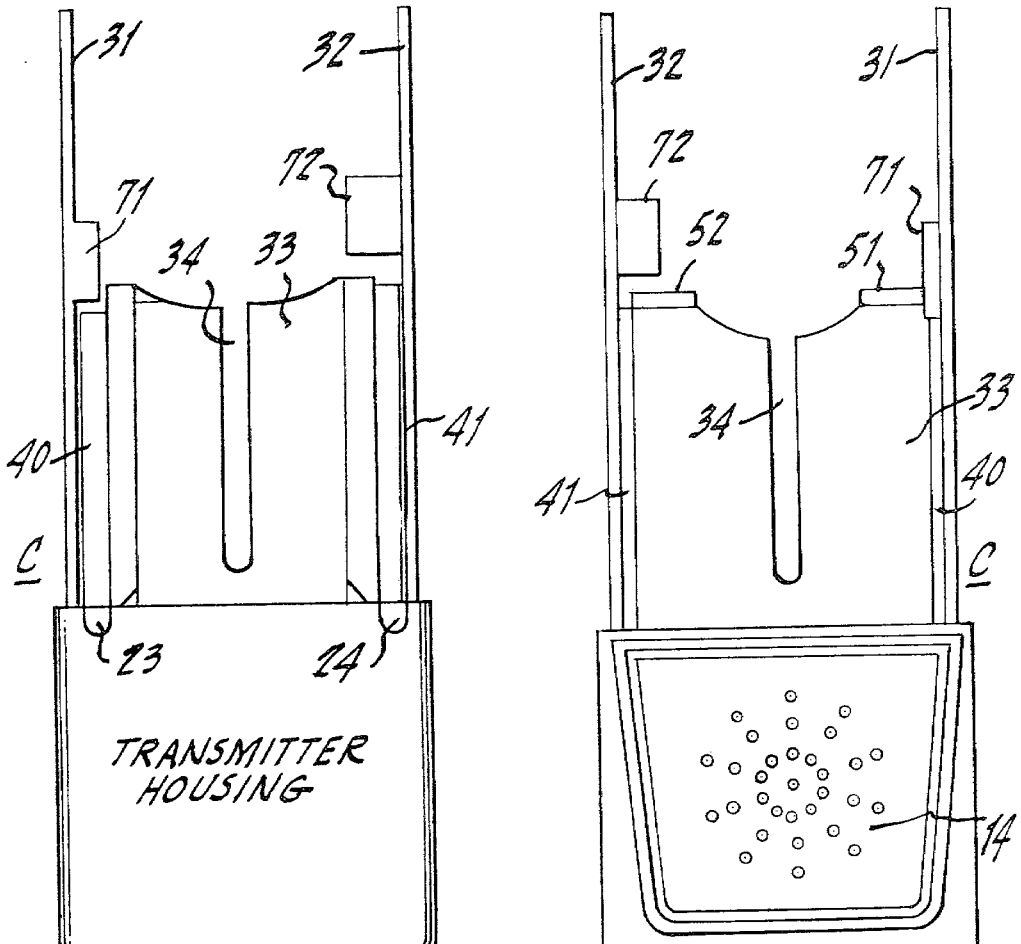
Fig. 4A  Fig. 4B
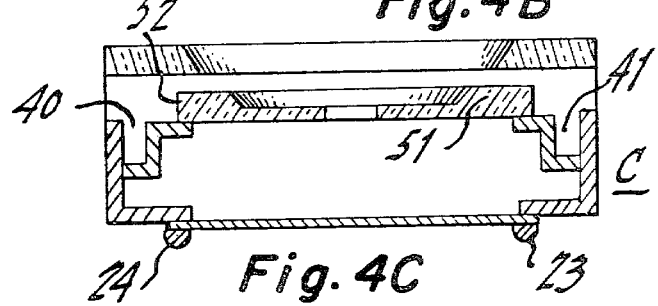
Fig. 4D  Fig. 4C
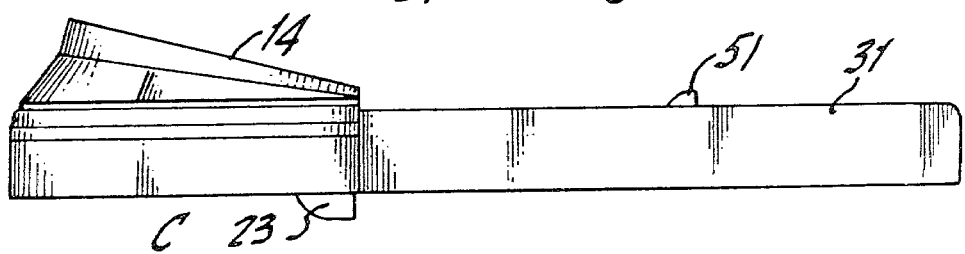

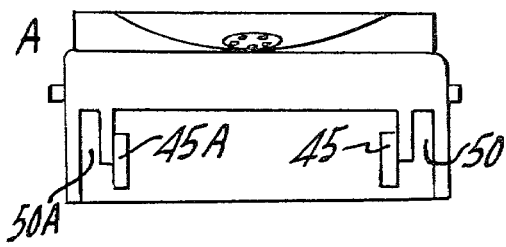
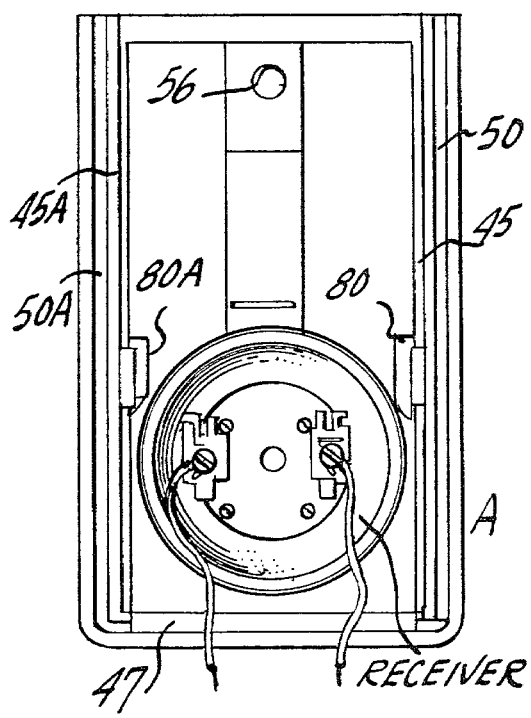
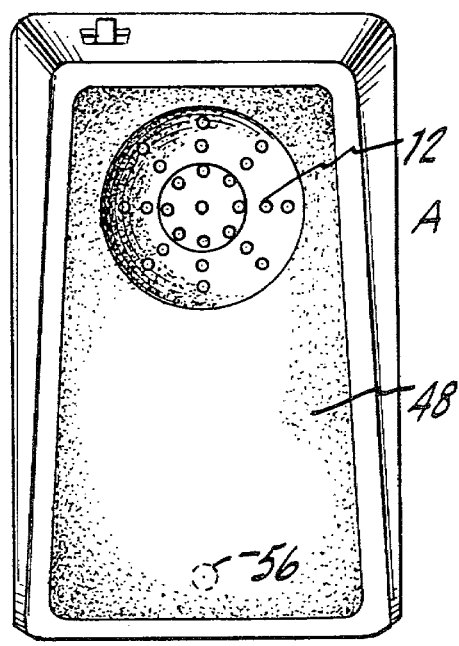

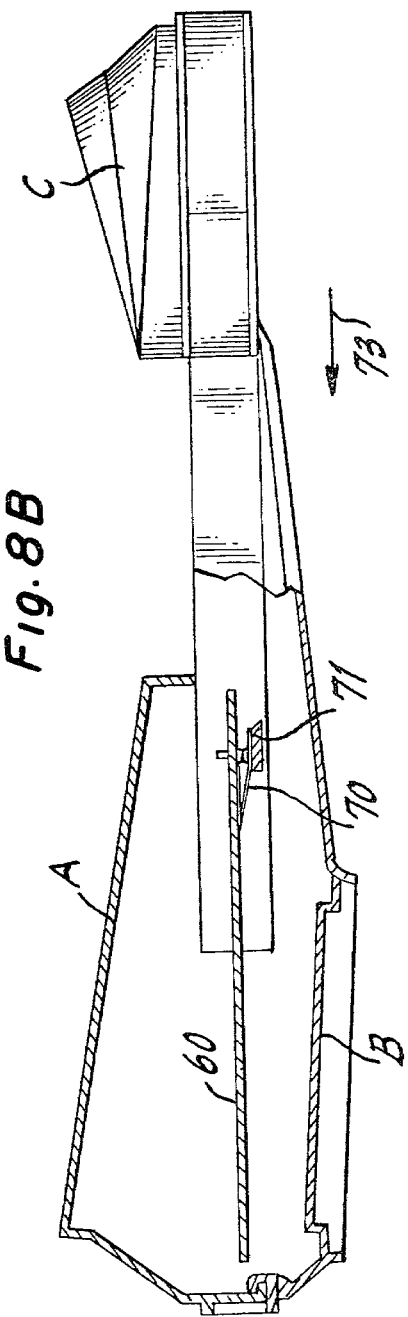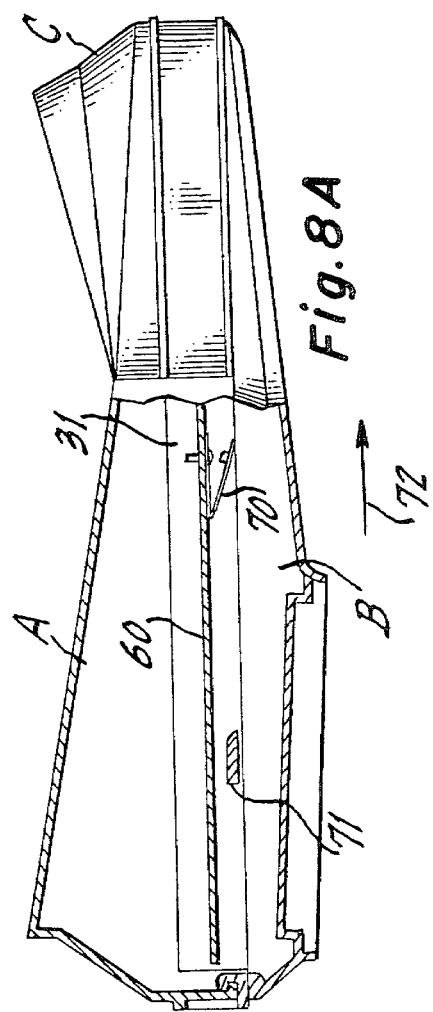

COMPACT TELESCOPING TELEPHONE SET

BACKGROUND OF THE INVENTION

This invention relates to telephone sets and more particularly to a compact telephone set employing a telescoping housing configuration for simple and reliable use.

There are many existing telephone sets which are available to the public and they are all different designs and shapes according to the aesthetic preferences of the user.

Basically, a telephone set must include a transmitter, a receiver and for selective communication, a dialer. As such, practical telephone sets embody other features such as two-way operation and ringing. Components employed in telephone sets have been greatly improved and presently are extremely rugged and reliable. The carbon transmitter is widely used in such sets as it is comparatively inexpensive and serves both to amplify energy and as an acoustic-electric converter. The modern telephone set also includes a number of circuits which are used for supervision. Among these are the switch hook which, among other things, closes the battery circuit when the handset of the phone is removed from the base. This powers the transmitter and actuates a relay to indicate a service request, or to connect the telephone line associated with the set to a dialing register. The functions performed by the telephone set are fairly well known in the prior art and are associated with great reliability.

There has been a desire in the prior art to provide telephone sets which tend to be smaller and more compact than the typical desk phone. These sets have the convenience of being easy to handle, have aesthetic appeal and take up a minimum amount of space.

One such instrument is designated as a flip phone and basically is a one piece telephone set which is connected to the operating company phone network by means of a coiled cord with modular jacks on each end. The instrument is placed on line by lifting the same up from a horizontal surface. The lifting action operates a spring activated plate which rotates outwardly from the underside of the phone set. Dialing is accomplished by depressing a keyboard (touch tone). Conversation is maintained by holding one's ear to the concave receiver section and speaking at the plate which is part of the rotatable assembly. Speech is reflected from the plate into a condensor microphone situated at the hinge or pivot end of the telephone set where the plate and body of the phone meet. The phone is "hung-up" or disconnected by repositioning the same on the horizontal surface, while being careful to allow the plate to fold back under the body of the phone.

The phone is quite compact but is associated with certain disadvantages which offset reliability and operation. The phone employs a cone speaker and condensor microphone as transmitting and recieving components. Such elements are more susceptible to damage during typical use than the carbon microphone and typical receiver components in present phones.

The phone requires the user to dial while the plastic foldout plate is pointed in the direction of the user and the user is required to "talk at" a plate or flat surface rather than into a perforated transmitter enclosure. This phone is extremely susceptible to false "hang-ups" as when it is put down, it is disconnected and hence, a conscious effort on the part of the user is not necessary to hang-up.

In view of these factors and others, it is seen that the operation of such an instrument is quite different from the standard telephone set and the differences are disturbing and confusing to a user.

Other prior art telephones employed a sliding arrangement where a transmitter and receiver and dialer are all located in a unitary housing. Upon sliding or extending the housing, one activated the phone to the "off-hook" status and by collapsing or returning the housing, one initiated the "on-hook" or hang-up mode.

In any event, such instruments were unreliable in that the mechanical assemblies were unstable and complicated and provided difficulty in operation and reliability due to construction techniques.

There is a need for a compact and reliable

There is a need for a compact and reliable telephone set which is capable of accommodating standard phone company receiver and transmitter components, while being compact and smaller in size than conventional instruments. The instrument provides a telescopic housing which must be extended for "off-hook" operation and retracted for "on-hook" conditions. This requires a conscious effort on the user's part to place the phone in operation and is consistent with present phone subset operation. The phone, when extended in the "off-hook" mode, provides a proper mouth to ear length ratio to accommodate all users and includes an ordinary receiver and transmitter to enable one to converse using the instrument much as the handset on the conventional instrument.

DESCRIPTION OF THE PREFERRED EMBODIMENT

A compact telescoping telephone instrument, comprising a first composite housing configuration having an internal hollow, said housing having a top surface recess containing a dialer mechanism for initiating telephone calls, a bottom surface at a given angle with respect to said top surface with a plurality of apertures on said bottom surface, a telephone receiver located in said hollow and having a surface communicating with said apertures, said housing having an opened front end, a closed back end and closed side surfaces, first guide means located on the opposite side of said top surface and within said hollow and relatively parallel to said side ends to provide a first path for guiding a slide member from said opened front end towards said back wall, second guide means located on the opposite side of said bottom surface and within said hollow for providing a second path in the same direction as said first path for guiding a slide member from said opened front end towards said back wall, a slidable housing member comprising a first hollow section at a first end of containing within said hollow a telephone transmitter, said housing having a right and a left slide member extending from said first section at a second end with said membersrelatively parallel one to the other, and platform means positioned between said members to align and position the same, each of said members having a top surface configuration adapted to coact with said first guide means to enable said slidable housing to move towards said back wall of said first housing, and said members further having a bottom surface configuration coacting with said second guide means to further enable said slidable housing to move in the same direction, whereby said slide members as coacting with said first and second guide means permits said slidable housing to slide towards and away from said back wall to thereby cause said transmitter to be positioned closer to or further away from said receiver and dialer according to the movement of said slidable housing.

BRIEF DESCRIPTION OF THE DRAWINGS

Above-mentioned and other features and objects of this invention will become more apparent by reference to the following description taken in conjunction with the accompanying drawings, in which:

FIG. 4A is a bottom view of a slidable transmitter housing (C).

FIG. 4B is a top view of the housing of FIG. 4A.

FIG. 4C is a front view of the housing of FIG. 4B.

FIG. 4D is a side view of the housing.

FIG. 5A is a front view of a receiver housing (A).

FIG. 5B is a top view of the housing of FIG. 5A.

FIG. 5C is a bottom view of the housing of FIG. 5A.

FIG. 8A is a diagrammatic view showing the telephone instrument in an on-hook position depicting an opened hook switch position.

FIG. 8B is a diagrammatic view of the telephone instrument in an off-hook position depicting closure of the hook switch.

DETAILED DESCRIPTION OF THE INVENTION

Figure 1:
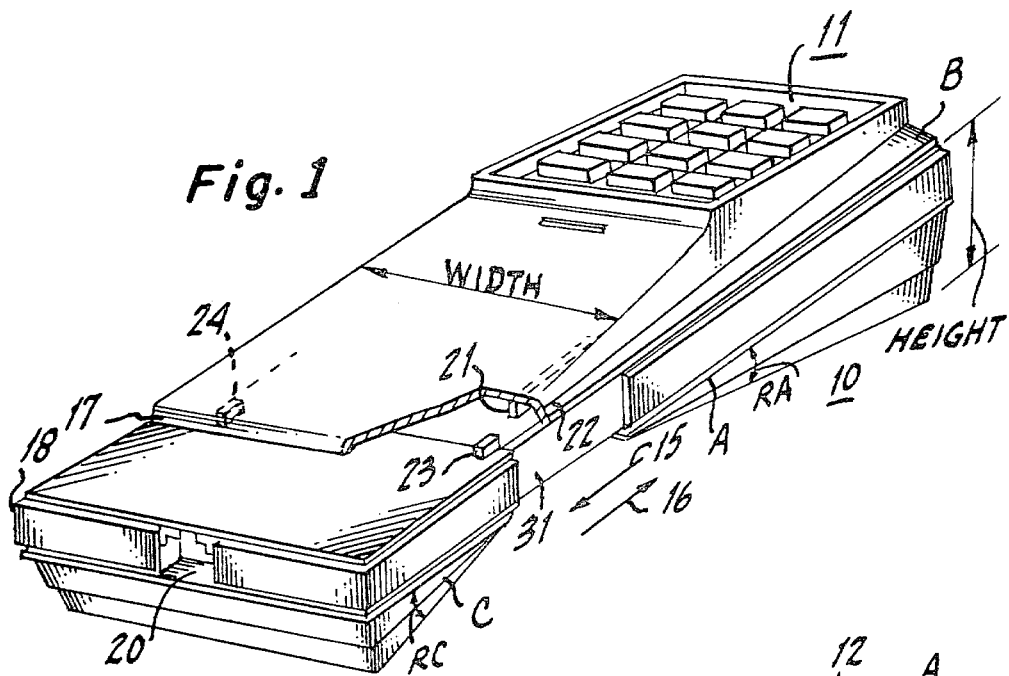
FIG. 1 is a top perspective plan view partially in cross section of a telephone instrument according to this invention.

Referring to FIG. 1, there is shown a perspective view of a telescoping telephone set 10 according to this invention. As previously indicated, a modern telephone receiver usually includes a transmitter, a receiver and a dialing assembly. The telephone set 10 of FIG. 1 basically consists of three housings.

A first housing A includes the telephone receiver which is conventional receiving element found in conventional modern day phone sets and is an extremely reliable component. The housing A is mounted relatively rigidly with respect to a top housing section B. The top housing section B contains a touch tone dialer assembly 11. As is known, the assembly 11 consists of a plurality of keys or buttons which bear the digits 0-9 and is of the configuration found on conventional instruments used for dialing telephone numbers. The unit 11 is available as a standard component or keyboard from many sources and upon actuation or any of the buttons associated with the keyboard 11, a touch tone frequency signal is transmitted over the telephone lines to initiate dialing pulses for a called number. Slidably mounted in relation to housings A and B is the housing C. The housing C contains a carbon microphone or transmitter also of conventional design and as employed in present day telephone instruments.

Figure 2:
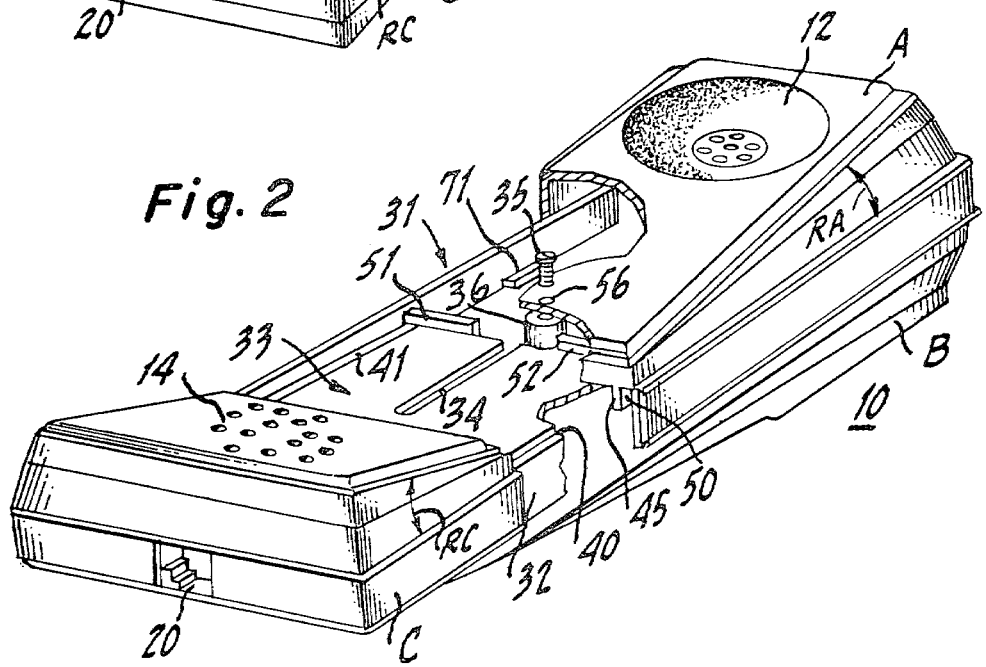
FIG. 2 is a bottom perspective view partially in cross section of the instrument of FIG. 1.

Referring to FIG. 2, there is shown a bottom perspective view of the instrument in FIG. 1 where the housings have been indicated by the same letters, A, B and C. As can be seen from FIG. 2, the receiver housing has a concave receiving area 12 which is held to the ear of a user and which enables him to place the instrument directly over his ear with the perforations included in area 12 directing the sound from the receiver. The transmitter housing C also contains a plurality of perforations 14 indicative of a transmitting region to enable the user to speak directly therein during conversation.

Hence, it is immediately ascertained from FIGS. 1 and 2 that the unit consisting primarily of housings A,B and C will enable one to conduct conversation in a relatively ordinary manner and according to the techniques employed in a conventional instrument. It can be seen from FIGS. 1 and 2 that housings A and C possess transverse surfaces which provide a given angular relationship between the plane of the receiver contained in housing A with the plane of the transmitter contained in housing C. The angle depicted as RA associated with housing A is about 12°, while the angle RC associated with housing C is about 21°. This enables a user to conduct an ordinary conversation without the necessity of concentrating on directing his voice into the transmitter section C. The above described angles provide an optimum relationship between the receiver and the transmitter to enable one to carry on a convenient conversation.

The instrument depicted in FIGS. 1 and 2 is partially extended. As indicated, the housing A is rigidly secured with respect to housing B during assembly. The transmitter housing C is slidably mounted with respect to housings A and B. A user, by grasping housing C may withdraw housing C in the direction of the arrow 15 to extend the same in a fully opened position which, as will be explained, is indicative of an off-hook position. When housing C is retracted or moved in the direction of arrow 16, the subset assembly 10 is in a closed position or on-hook condition. In this position, the front flange 17 associated with housing B is in alignment with the edge 18 of housing C and the instrument assumes, in this position, the smallest volume.

The instrument is approximately 2½" wide. The housing B is approximately 6" long and hence, the dimension of the instrument 10 is approximately 6" long when in the closed position. The maximum height of the instrument is about 1½". When the instrument is in its extended position where the transmitter housing C is fully retracted in the off-hook mode, the effective length of the instrument increases by about 2" and hence, the overall length is about 8". Based on the above dimensions, it is therefore understood that the instrument depicted in FIGS. 1 and 2 is extremely compact, while capable of performing each and every function of the conventional telephone.

Also shown in FIGS. 1 and 2 is a terminal aperture 20 for insertion therein of a coiled telephone cord with modular jacks on each end to permit coupling of the instrument to a conventional telephone line.

Before proceeding with a detailed explanation of the mechanical structure, a brief description of the simplicity of operation of the instrument 10 is believed to be warranted. Essentially, the instrument 10 is placed on line or in the off-hook position by retracting housing C which contains a carbon microphone. The retracting of the housing C actuates two leaf spring switches which alternately place the phone on line and allow the last number dialed to be recorded and redialed by the touch of a single button on the key pad 11. When the phone is in the extended position as above, the key pad 11 is activated and the buttons located thereon can accommodate normal dialing. The user engages in conversation by holding recess 12 associated with housing A to his ear and by talking into the transmitter perforations 14 associated with housing C. The phone is hung up or rendered in its on-hook position by sliding housing C into housings A and B. It is not necessary to push section C completely closed as the switch configuration to be described places the phone in the on-hook condition when housing C is still extending a relatively small amount, which distance as will be explained, can be varied.

It is understood that when the instrument 10 is in its on-hook condition, it can receive a ringing signal from the telephone line. The instrument contains internal circuitry which upon receipt of a ringing signal, will activate a buzzer contained on a circuit board, to be described, and hence, affords an audible tone to the user indicative of a ringing signal.

Referring to FIG. 1, it is seen that a portion of housing B is shown in broken view. Located on the undersurface of housing B is a flange guide member or wall 21. The wall 21 extends a predetermined distance back towards the dialer assembly 11. The wall 21 forms a slot with the side wall 22 of the housing B. A projection or tab 23 is rigidly positioned on housing C. Another projection 24 also exists on the left side of housing C and is relatively identical in configuration as projection 23. This projection 24 also rides in a channel or slot formed by an additional flange as 21A located on the other side of housing B. Thus, housing C when emplaced with respect to housings A and B, has two tabs 23 and 24 which are guided and ride in the channels formed by the flange 21 and the side walls of the housing B. The projections 23 and 24, as can be ascertained, function as stop mechanisms and hence, aid in preventing a user from withdrawing the housing C from housings A and B.

Figure 3A:
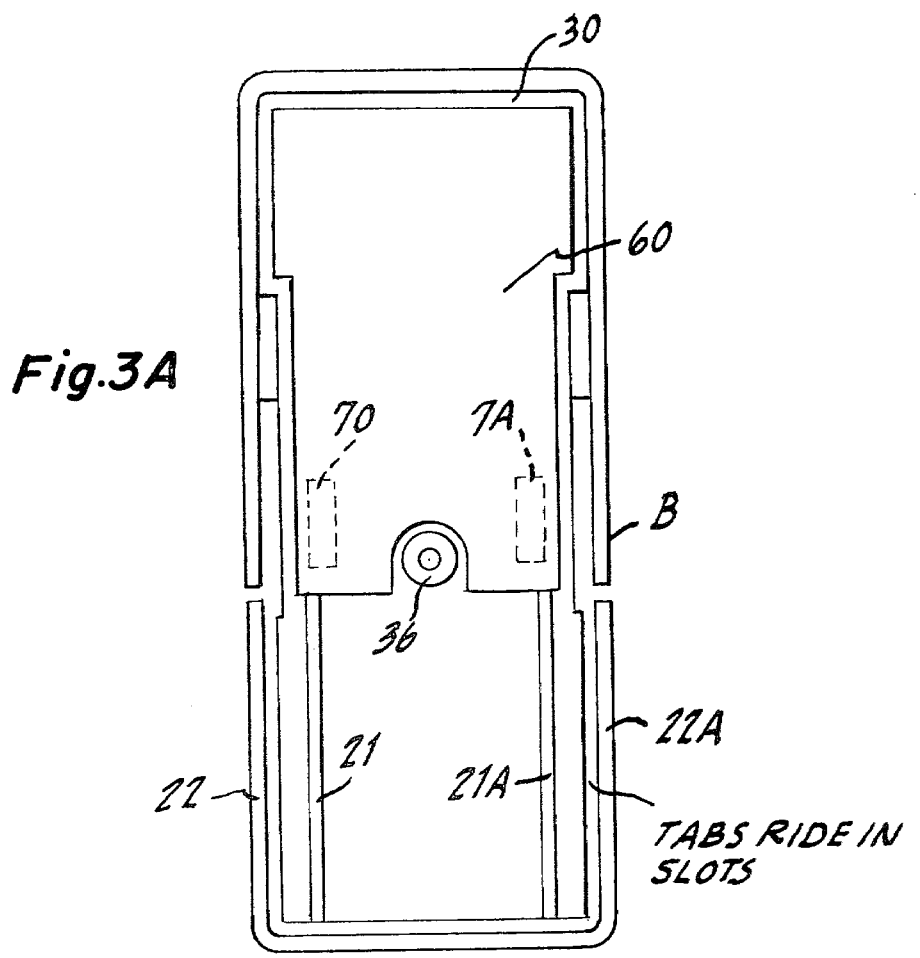
FIG. 3A is a bottom view of a housing (B) containing a dialer keyboard.
Figure 3B:
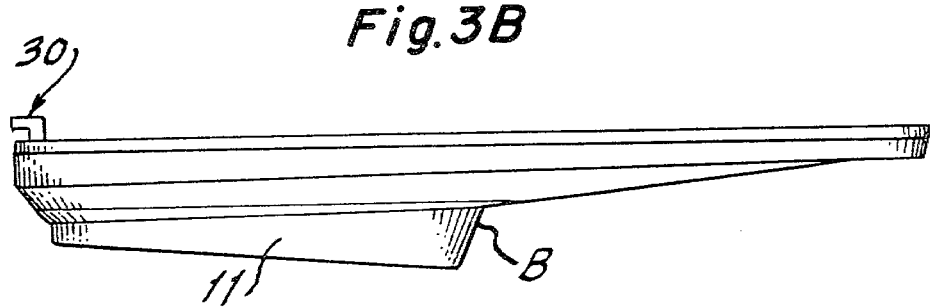
FIG. 3B is a side view of the housing (B).

Referring to FIG. 3A, there is shown a top view depicting walls 21 and 21A and the slots formed with the corresponding side walls as 22 and 22A of the housing B. FIG. 3B shows a side view of the housing B and shows the surface upon which the dialer assembly 11 is mounted.

It is also seen in FIG. 3B that there is an extending flange or lip 30 which secures the rear portion of housing B to housing A when the instrument 10 is assembled.

Referring to FIG. 2, thee is also shown a partial section taken through housing A and a partial section taken through housing C. The housing C essentially consists of a transmitter section 14 which, as indicated above, contains a standard carbon microphone. The microphone used in a normal receiver is about 1½" or more in diameter and is generally circular in configuration. The receiver is about the same size.

The housing C is formed from a suitable plastic by a molding operation. Essentially, the housing contains two extending side rail assemblies designated as 31 and 32. The side rail assemblies are joined together at a front end by a platform 33. Platform 33 has a slot 34 located thereon, which slot accommodates a single screw 35, which screw extends via an aperture in housing A into a threaded boss 36 located on housing B (FIG. 3A). This single screw 35 firmly secures the entire assembly together.

The housing C essentially has two slots or channels 40 and 41 located on each side of the platform 33. These slots are formed by one wall of the slide channels 31 and 32 and by a wall of the platform 33. If reference is made to FIGS. 4A to 4D, there is shown respectively a top, bottom, front and side view of the housing C. The slots or members 40 and 41 are accommodated by a flange as 45 located on a corresponding surface of housing A. The flange 45 is similar to flange 21 associated with housing B and extends along housing A to accommodate the slide members 31 and 32 of housing C together with slots 40 and 41 formed between the slide members 31 and 32.

Referring to FIGS. 5A to 5C, there is shown a side, top and bottom view of the housing A. The wall 45 and the corresponding wall 45A on the other side are clearly shown in FIG. 5A.

As can be seen from FIG. 2, the member C is accurately guided by means of the slots 40 and 41 and the walls of the slide members 31 and 32. These are accurately aligned and controlled in movement by means of the flanges 45 and 45A formed in the receiver housing A.

Also seen in FIGS. 2 and 5 is the fact that the slide channel members 31 and 32 also ride in the slots 50 formed between the flange 45A and the side wall of housing A. The slots 50 and 50A further assure a reliable guide for the movable transmitter housing C.

As indicated, the slot 34 in the platform 33 serves to accommodate the screw 35 which is secured in aperture 56 of housing A and as indicated, serves to couple housing A to housing B (FIG. 3) via the threaded aperture in the boss 36. Accordingly, the extendable housing C is guided and maintained in accurate and reliable position with the housings A and B by means of three distinct mechanical assemblies. Namely, as shown in FIG. 1, the projections 23 and 24 associated with housing C are positioned to ride in the channels located in housing B and formed between the side walls 22 and 22A and the extending flanges 21 and 21A. These projections 23 and 24 assure that the bottom surface of the extendable housing C is accurately controlled. The top surface of the housing C is accommodated by means of the slide members 31 and 32 and the slots 40 and 41 (FIG. 4) which are accommodated by the flanges 45 and 45A of housing A (FIG. 5) and the channels 50 and 50A formed between the extending flanges 45 and 45A and the side walls of housing A. The slot 34 in the platform 33 serves further to permit sliding of the housing by providing a passageway for the screw 35 which secures housing A to housing B.

Also shown in FIG. 5C is a lip or flange 47, which flange accommodates the upstanding flange 30 of housing B securing housing A to housing B when they are in alignment. The aperture 56 of housing A permits insertion of the screw 35 therein to further secure housing A to housing B via the threaded boss 36.

As seen from FIG. 5B, the front surface of housing A which contains the recess 12 is covered by means of an attractive vinyl sheet 48 and hence, the top of the screw 35 when inserted in aperture 51, is not visible but can be accessed by lifting of the vinyl.

The platform 33 of housing C further includes two extending projections 51 and 52. The projections 51 and 52 coact with the underside of housing A and further prevent the housing C from being withdrawn from the assembly. Thus, these upstanding flanges 51 and 52 serve together with the projections 23 and 24 on the other surface of housing C to assure that the housing C cannot be removed or extended beyond the limits imposed by the above noted mechanical restraints. The platform 33 serves to provide great rigidity to housing C and in order to maintain the extending slide members 31 and 32 in a relatively rigid position.

Hence, as can be seen from the above, when the housings A,B, and C are emplaced and held in position by the single screw 35, the transmitter housing C can be extended and retracted at will. It is completely guided on both top and bottom surfaces by the corresponding flanges and channels and hence, will operate extremely reliably independent of the type of motion a user may attempt or actually impart to the housing C when it is in the process of being pulled out or pushed in as the telephone is being used. The fact that the housing C is guided both on the top and bottom surfaces enables extremely reliable operation of the instrument 10 over prolonged periods of use. This, of course, is an important aspect for any telephone instrument as the typical life of such instruments is for many years of operation.

Figure 6:
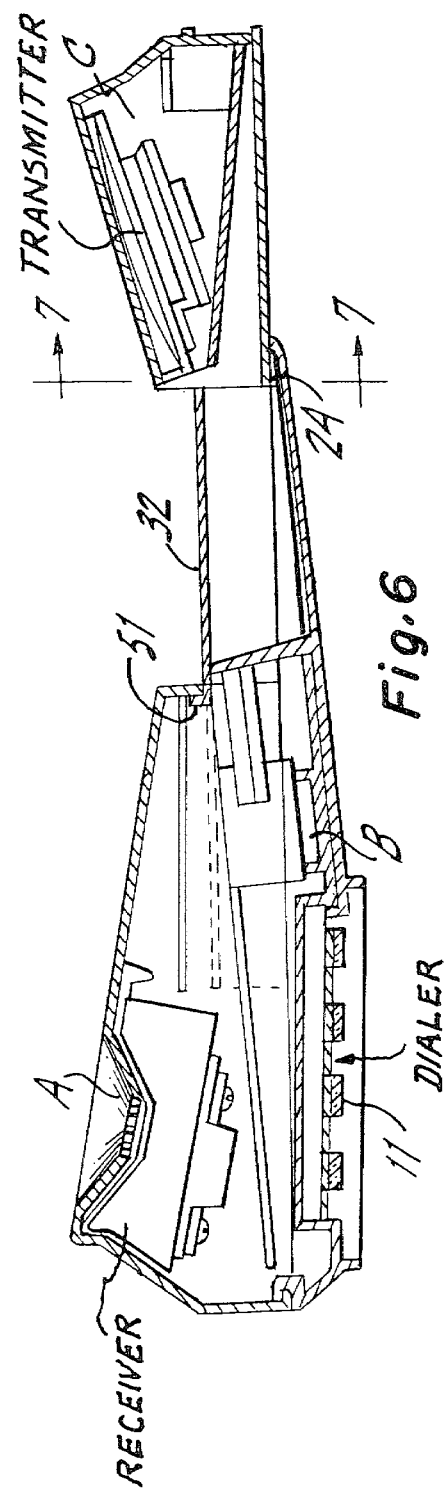
FIG. 6 is a side diagrammatic view of the telephone instrument of FIGS. 1 and 2 in an extended or off-hook position.

Referring to FIG. 6, there is shown a cross sectional side view of the housings A,B and C. FIG. 6 is a diagrammatic view showing the housing C in a fully extended position. The dashed line shows the housing C in a retracted position. As can be ascertained from FIG. 6, when the housing is fully extended, both projections 24 and the tab 51 prevent further movement of the transmitter housing C from housings A and B.

Figure 7:
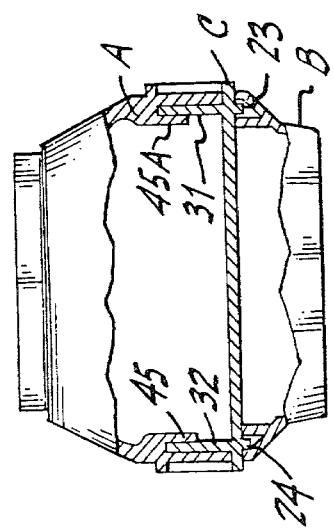
FIG. 7 is a partial cross sectional view taken through line 7—7 of FIG. 6 and depicting the guide mechanisms between housings A,B and C.

Referring to FIG. 7, there is shown a cross sectional view taken through line 7—7 of FIG. 6. FIG. 7 shows the relationship of the various projections as 23 and 24 on housing C as well as the slide members 31 and 32 and how they are accommodated within the associated slots of housings A and B. Accordingly, there has been described a rigid mechanical assembly permitting one to withdraw and insert housing C to enable on-hook and off-hook operation of the telephone assembly 10 in a rapid and reliable manner. The mechanical assembly thus depicted assures that the housing C can be pulled out and pushed in reliably and without concern over lateral or extraneous forces that might be imparted to the assembly by a typical user and under the many different conditions which a telephone set would be subjected to during conventional use.

The above described configuration affords great mechanical stability while providing an extremely compact and practical instrument. As can be ascertained from FIG. 4, the transmitter housing C has a first hollow section which accommodates an ordinary carbon microphone used in a conventional telephone instrument. FIG. 5 depicts the housing A which contains a receiver unit also of the type employed in a conventional telephone system. Accordingly, the compact phone above described enables one to employ conventional receivers and transmitter modules which have been developed, tested, and used for many years and are extremely economical and reliable in operation.

Housing B, as shown in FIG. 3, has a recess or section for accommodating a conventional touch tone keyboard 11 which, as indicated, is also a commercially available component and of the type employed in conventional telephone instruments.

SUPERVISION OPERATION OF THE TELEPHONE UNIT 10

As above indicated, apart from the receiver, transmitter and dialer, a telephone instrument such as 10 is required to perform certain operations generally designated as supervisory operations. The telephone above described serves immediately to be placed in the off-hook condition when the housing C is extended to the position, for example, shown in FIG. 6 with respect to housings A and B. In order to operate in the off-hook condition, one must provide a closed circuit to the telephone lines connected to the instrument. In this manner, a current is supplied to the instrument from the battery located at the central office. The flow of this current indicates to the central office that the instrument is busy. It is, of course, understood that a busy condition could mean that the instrument is being used for conversation as it is part of an existing call either as a called or a calling party or that the instrument is requiring service or is dialing and so on. In any event, a conventional receiver uses a hook switch which operates when a hand set is lifted from a cradle or from the base assembly of a telephone. This switch action must, of course, be provided in the above described telephone instrument.

Referring to FIG. 3A, there is shown a printed circuit board 60. The printed circuit board 60 contains various components to enable the telephone set 10 to operate properly. As such, the printed circuit board contains a ring detector, which circuit serves to detect a ringing signal impressed on the telephone lines when the instrument is being accessed. The detector serves to actuate a buzzer or other device also located on the printed circuit board. The board contains other conventional components which are found in most telephones such as a side tone circuit and varistor devices to limit the amplitude of the transmitted and received signal. Such devices are well known and exist in most conventional telephones. The particular phone described herein also contains integrated circuit modules which enable the storage of a telephone number where that number may be automatically retrieved for immediate dialing by the depression of a key associated with keyboard 11. Such techniques are well known in the telephone art and are not considered part of this invention and therefore, further discussion of the same will be limited.

The circuit board 60 also interfaces with the keyboard 11 and has a circuit for converting the depression of a key into suitable signals indicative of dialing pulses or dialing frequencies for operation over a conventional telephone line. In this manner, the keybord 11 is connected to the printed circuit board 60 by means of a suitable flat ribbon conductor. The printed circuit board 60 is included in the hollow between housings A and B and also interfaces with the transmitter and receiver modules contained in housings A and C. Located on the printed circuit board when it is properly positioned between housings A and B are two leaf type switches.

Referring to FIG. 8A, there is shown a first switch 70 which is opened when housing C is in the on-hook position with respect to housings A and B. The switch 70 is mounted on the printed circuit board 60 and sits with its contact in the normally opened position when housing C is in the off-hook position. Not shown but directly on the opposite side of the printed circuit board 60 is an additional switch in relatively the same position on the circuit board as switch 70.

Shown in FIG. 8A is a tab 71. The tab 71 is located and rigidly secured to the bottom edge of the extending slide member 31 associated with housing C. Referring to FIG. 4A, there is shown the tab 71 which extends from the slide member 31. Adjacent tab 71 is another tab 72 which is secured to member 32. It is noted that tabs 71 and 72 are displaced one with respect to the other. Essentially, as shown in FIG. 4A, tab 72 is located above tab 71 on the vertical axis. Referring to FIG. 2, tab 71 is again clearly shown in position.

The printed circuit board 60, as indicated, essentially is located between housings A and B and basically as shown in FIG. 3A, the printed circuit board 60 has the switches 70 and 70A located on the underneath side or bottom surface of the board with the open contact of the switches as 70 facing the top surface of the housing B. The printed circuit board as located rests or is emplaced between housings A and B by resting on the tabs as 80 and 80A of FIG. 5C and the printed circuit board 60 as shown in FIG. 3, has a semicircular aperture on the front side surface which encircles the central boss 36 associated with housing B (FIG. 3). As previously indicated, the aperture 56 in housing A accommodates the screw 35 which secures housing A to B when the printed circuit board is positioned as shown in FIG. 8A.

As the housing C is retracted or moved into its opened position as designated by arrow 72 of FIG. 8A, the tab 71 coacts with the leaf spring contact of switch 70 and urges the contact upward to hence close the switch as shown in FIG 8B. In a similar manner, tab 72 will operate to close switch 70A. However, due to the locations of tabs 71 and 72 on the slide members 31 and 32 associated with housing C, switch 70 is closed prior to switch 70A based on the location of the tabs. As can be ascertained from FIG. 8B, when the housing C is again pushed in to housings A and B in the direction of arrow 73, tab 72 releases switch 70A first and thereafter tab 71 releases switch 70.

In the above manner, one obtains closure as follows: When the telephone is moved in the position shown in FIG. 8B, tab 71 closes switch 70 before tab 72 closes switch 70A and this occurs in the off-hook position. When housing C is moved in the position as shown in FIG. 8A or into the on-hook position, tab 71 releases switch 70 before tab 72 releases switch 70A. Switch 70A controls the hook switching sensing circuitry associated with the printed circuit board. Switch 70 shorts a resistor in the tip lead which provides loop current to the telephone in the off-hook mode. This loop current must be available before switch 70A closes to allow the off-hook sensing pin associated with the circuitry contained on the printed circuit board to detect the current for proper operation.

Hence, as is seen in FIGS. 8A and 8B, one obtains a selective switch closure when the telephone set is placed in the off-hook position by moving housing C to the extended position. This sequentially closes switches 70 and 70A in a sequence which causes switch 70 to close before switch 70A and causes switch 70A to open before switch 70 when the phone is placed in the on-hook position. This type of operation is also available in conventional phones via the hook switch which affords a delayed operation and hence, such a hook switch in a conventional phone is actually more difficult to implement than the switching mechanisms described above.

One can also ascertain that the location of tabs 71 and 72 on the slide members 31 and 32 of housing C and the placement of switches 70 and 70A on the printed circuit board determines when the switches will be activated in regard to the position and traveling of housing C. In this manner, the respective components can be located so that the full retraction of housing C is not necessary to activate the switches and hence, the instrument can be placed in the on-hook and off-hook positions via the operation switches 70 and 70A within predetermined limits concerning the position of housing C and hence, housing C need not be fully inserted or retracted to enable on-hook or off-hook operation.

The electrical control of a telephone circuit via switches 70 and 70A to provide loop current as well as an activating signal to electrical circuitry contained on the printed circuit board is a necessary feature in a telephone instrument and is accurately and reliably supplied to tabs 71 and 72 in activating switches 70 and 70A and the above operation, as indicated, is extremely effective and reliable.

There has thus been described a telephone instrument of a telescoping type which is extremely compact, while being mechanically rugged. The instrument consists of three housings; two of which as housing A and housing B respectively contain the receiver and dialing components of the telephone with an interfacing circuit board 60 mounted there between. A third housing C contains a carbon microphone and is slidably mounted with respect to housings A and B and as such, is accurately guided therebetween by means of multiple guide assemblies which enable reliable operation of housing C to afford on-hook and off-hook operation. The extension and retraction of housing C within housings A and B activates supervision switches in a sequential manner to assure that loop current is provided by the instrument during a call or pursuant to a service request and that the proper circuitry is switched in operation upon the furnishing of the loop current by the instrument.

As in most telephone instruments, the above described unit receives operating voltage from the 48 volt battery associated with the central office. The unit, based on its structural configuration, enables one to employ a conventional carbon microphone and receiver which are presently employed in conventional telephone subsets and hence, operation of the unit is compatible with modern day telephone instruments. For example, one may position the receiver audio component in housing C and the transmitter component in housing A, while still maintaining the above operation. These and other aspects of the invention will become clear to one skilled in the art upon reading the specification and all modifications and alternatives are deemed to be within the scope and breadth of the claims appended hereto.

We claim:

1. A compact, telescoping telephone instrument, comprising:

a first composite housing configuration having an internal hollow, said housing having a top surface recess containing a dialer mechanism for initiating telephone calls, a bottom surface at a given angle with respect to said top surface with a plurality of apertures on said bottom surface, a telephone audio component located in said hollow and having a surface communicating with said apertures, said housing having an opened front end, a closed back end and closed side surfaces, a first guide means located on the opposite side of said top surface and within said hollow and relatively parallel to said side ends to provide a first path for guiding a slide member from said opened front end towards said back wall, second guide means located on the opposite side of said bottom surface and within said hollow for providing a second path in the same direction as said first path for guiding a slide member from said opened front end towards said back wall, a slidable housing member comprising a first hollow section at a first end for containing within said hollow another telephone component, said housing having a right and a left slide member extending from said first section at a second end with said members relatively parallel one to the other and platform means positioned between said members to align and position the same, each of said members having a top surface configuration adapted to coact with said guide means to enable said slidable housing to move towards said back wall of said first housing, and said members further having a bottom surface configuration coacting with said second guide means to further enable said slidable housing to move in the same direction, whereby said slide members as coacting with said first and second guide means permits said slidable housings to slide towards and away from said back wall to thereby cause said another telephone component to be positioned closer to or further away from said dialer according to the movement of said slidable housing.

2. The telephone instrument according to claim 1 wherein said first composite housing comprises a top housing section having a top surface recess for containing said dialer with an open bottom, a bottom housing section having a bottom surface at said given angle with an opened top relatively congruent to said open bottom of said top housing section and means for securing said top section to said bottom section with said open bottom and said open top communicating to form said internal hollow, with said top housing section containing said dialer mechanism, and said bottom housing section containing said telephone audio component.

3. The telephone instrument according to claim 1 wherein said opened front end of said first composite housing contains a flange extending upwardly from said bottom surface, and means located on said platform of said slidable member adapted to coact with said flange to prevent dislodging of said slidable housing from said composite housing.

4. The telephone instrument according to claim 1 wherein said first guide means located on the opposite side of said top surface and within said hollow comprises a first flange extending from said opened front end towards said back wall and spaced a predetermined distance from a first side surface to form a first guide channel therebetween, a second flange extending from said opened front end towards said back wall and relatively parallel to said first flange to form a second guide channel with said opposite side surface.

5. The telephone instrument according to claim 4 wherein said slidable housing includes on said top surface thereof a first and second projection spaced apart one from the other at a distance determined by said first and second guide channels and each adapted to ride in an associated channel to cause said slidable housing to slide from said opened front end towards said back wall.

6. The telephone instrument according to claim 1 wherein said second guide means located on the opposite side of said bottom surface includes a third flange extending from said opened front end towards said back wall and spaced a predetermined distance from a first side surface of said first housing, and a fourth flange extending in the same direction as said third flange and parallel thereto and spaced from said other side surface by said predetermined distance.

7. The telephone instrument according to claim 6 wherein said platform means positioned between said slide members includes first and second channels located at each side and located between the juncture of said slide members and said platform for coacting with and riding within said third and fourth flanges.

8. The telephone instrument according to claim 1 wherein said first section of said slidable housing has a sloping top surface at a given angle from the horizontal with said surface sloping from a top side to a bottom side and relatively in a plane opposite to the said angled bottom surface of said first housing, said sloping top surface of said first section having a plurality of apertures for communicating with said telephone component with said respective angled surfaces of said first section and said bottom surface presenting an optimum receive/talk condition to a user of said instrument.

9. The telephone instrument according to claim 1 wherein said given angle of said bottom surface is approximately twelve degrees with respect to the horizontal plane.

10. The telephone instrument according to claim 8 wherein said given angle of said sloping top surface of said slidable housing is about twenty-one degrees with respect to the horizontal plane.

11. The telephone instrument according to claim 1 wherein said telephone audio component located in said first composite housing is a telephone receiver.

12. The telephone instrument according to claim 1 wherein said telephone audio component located in said slidable housing member is a carbon telephone transmitter.

13. A compact, telescoping telephone instrument, comprising:

a first housing (B) having a top surface and an opened bottom surface, said top surface having a recess for containing a dialer mechanism, first and second sidewalls and a back wall extending from said top surface to form an enclosure for said mechanism, said bottom surface of said housing (B) having first and second channels parallel to each other and extending from a opened front end towards said back wall, with each channel associated with and located a predetermined distance frm said an associated sidewall, a second housing (A) having a sloping top surface including a plurality of apertures, first and second sidewalls and a back wall, with an opened bottom surface, said sidewalls and back walls as surrounding said open bottom surface relatively congruent to said sidewalls and back walls of said first housing to permit said first housing to be emplaced over said second housing, to form a hollow recess therebetween, with said second housing containing a telephone audio component communicating with said apertures in said sloping top surface, with said top surface sloping from said back walls of said housings as emplaced towards said opened front end, said second housing (A) having located beneath said top surface and within said hollow first and second flanges directed from said opened front end towards said back wall and each separated from an associated sidewall by a predetermined distance, a third slidable housing (C) adapted to be inserted in said opened front end of said first and second emplaced housings, said third housing containing a first hollow section for containing another audio component and having first and second elongated side rail assemblies extending from a surface of said first section and relatively parallel one to the other, with a top surface of said side rail assemblies adapted to coact with and be guided by said first and second channels in said first housing (B) and with a bottom surface of said side rail assemblies adapted to coact with and be guided by said first and second flanges of said second housing (A) to permit said housing (C) to slide with respect to said first and second housings (A and B), means coupled to said third housing (C) to limit the distance said housing (C) slides with respect to said first (B) and second (A) housings.

14. The telephone instrument according to claim 13, further including:

a central boss depending from the bottom of said back surface of said first housing (B) and having an aperture located thereon.

15. The telephone instrument according to claim 14 wherein said sloping top surface of said second housing has an aperture therein for communicating with said aperture in said central boss when said first housing (B) is placed in congruency with said second housing (A), fastening means inserted in said apertures of said boss and said sloping surface for securing said first housing (B) to said second housing (A).

16. The telephone instrument according to claim 15 wherein said third slidable housing (C) further includes a platform positioned between said first and second elongated side rail members to provide support thereto while rigidly positioning the same.

17. The telephone instrument according to claim 16 wherein said platform includes a central aperture adapted to encircle said fastening means to allow said slidable housing (C) to move freely.

18. The telephone instrument according to claim 13 including means coupled to said slidable housing (C) operative to limit the movement of said housing (C) when said housing (C) is slid away from housings (A) and (B).

19. The telephone instrument according to claim 13 wherein said sloping top surface of said second housing (A) is at an angle of about twelve degrees with respect to the horizontal plane.

20. The telephone instrument according to claim 13 wherein a top surface of said first hollow section is at a predetermined angle, with said surface containing a plurality of apertures, said angle and hence the slope of said surface directed opposite to said sloping top surface of said second housing (A), wherein said telephone audio components have respective portions physically facing each other to provide a convenient receiver/transmit path for a user.

21. The telephone instrument according to claim 20 wherein said predetermined angle of said top surface of said first hollow section is about twenty degrees with respect to the horizontal plane.

22. The telephone instrument according to claim 13 further including a circuit board located in the hollow formed when said first housing (B) is emplaced in congruency with said second housing (A).

23. The telephone instrument according to claim 13 wherein said audio component in said second housing (A) is a telephone receiver component.

24. The telephone instrument according to claim 13 wherein said other audio component in said slidable housing (C) is a carbon transmitter.

* * * * *